United States Patent [19]

Ichida

[11] Patent Number: 5,451,109
[45] Date of Patent: Sep. 19, 1995

[54] LINEAR MOTION ROLLING GUIDE UNIT

[75] Inventor: Tomohiro Ichida, Gifu, Japan

[73] Assignee: Nippon Thompson Co., Ltd., Tokyo, Japan

[21] Appl. No.: 288,212

[22] Filed: Aug. 9, 1994

[30] Foreign Application Priority Data

Aug. 31, 1993 [JP] Japan .................. 5-237243

[51] Int. Cl.6 .................. F16C 29/06
[52] U.S. Cl. .................. 384/15
[58] Field of Search .......... 384/15, 45, 43, 44; 464/168

[56] References Cited

U.S. PATENT DOCUMENTS 5,388,912 2/1995 Agari .................. 384/15

FOREIGN PATENT DOCUMENTS 983211991 10/1991 Japan .
1641281993 6/1993 Japan .
914961992 7/1994 Japan .

Primary Examiner—Lenard A. Footland
Attorney, Agent, or Firm—Browdy and Neimark

[57] ABSTRACT

The linear motion rolling guide unit according to this invention utilizes the whetstone accommodating spaces in the casing in mounting the under seals so as to secure a large enough gap between the lower end of the slider and the lower end of the track rail or the bed surface. The under seal consists of a core member and an elastic member secured to the core member. The under seals are installed in the whetstone accommodating spaces from under the casing and the end caps. The brackets integrally formed with the core member of the under seal are fitted in the engagement grooves formed in the end caps, and the locking claws provided at the upper end of the brackets are engaged in the engagement holes formed in the end caps, thus assembling the under seal into the slider.

9 Claims, 4 Drawing Sheets

LINEAR MOTION ROLLING GUIDE UNIT

BACKGROUND OF THE INVENTION

1. Field of the Invention

The present invention relates to a linear motion rolling guide unit, in which a slider having a casing slides along a track rail with a number of rolling elements interposed therebetween.

2. Description of the Prior Art

In a conventional linear motion rolling guide unit, a slider that slides on a track rail consists of a casing, end caps fixed to both ends of the casing, end seals attached to the end caps, and an under seal provided to the underside of the slider. A linear motion rolling guide unit as shown in FIG. 10 is known. The unit generally consists of a track rail 1 having raceway grooves 27 formed on longitudinally extending side walls 26 thereof, and a slider 2 slidably mounted astride the track rail 1. The slider 2 includes a casing 3, which is slidable relative to the track rail 1 and has raceway grooves 29 formed at positions facing the raceway grooves 27 on the track rail 1, a number of rolling elements 5 roll-running between the opposing raceway grooves 27 and 29 relatively movable therebetween, and end caps 12 attached to the longitudinal ends (in a sliding direction) of the casing 3, the longitudinal direction being the sliding direction of the casing 3. The end cap 12 has at its end surface an end seal 28 that provides the sealing between the track rail 1 and the slider 2. The casing 3 is provided with under seals 30 for sealing the underside of the casing 3 and the end caps 12 and also the longitudinally extending side walls 26 of the track rail. The slider 2 is mounted astride the track rail 1 and freely slidable relative to it through a number of rolling elements 5 formed as balls circulating along the raceway grooves 27 in the track rail 1. The rolling elements 5 are circulating through a raceway 32 formed between the raceway grooves 27 and 29, a direction changing passage (not shown) formed in the end cap 12 and a return passage 31 formed in the casing 3.

What is shown in FIG. 9 is an example structure of the conventional linear motion rolling guide unit showing how the under seal 30 is mounted to the casing 3. Components of the linear motion rolling guide unit of FIG. 9 that are identical to the corresponding ones shown in FIG. 10 are assigned like reference numerals. In FIG. 9, the slider 2 has the under seal 30—which is a plate body formed at one side with a lip portion 20 in sealing contact with the longitudinally extending side walls 26 of the track rail 1—arranged at the underside of the casing 3 and the end caps 12 mounted to the longitudinal ends of the casing, the longitudinal direction being the sliding direction of the casing 3. The under seal 30 is fixed by inserting screws through through-holes formed in the under seal 30 and fastening the screws into threaded holes in the casing 3.

Because the under seal 30 is mounted to the casing 3 by a fixing means 33 such as rivets and screws, its mounting and dismounting is troublesome. Although the under seal 30 has the advantage of being simple in shape and therefore easily manufactured, there are drawbacks that positioning errors easily occur with respect to the casing 3 and the track rail 1, in which raceway grooves 27, 29 are formed, and that because the under seal 30 is thin, it is easily deformed by external force and heat. This in turn gives rise to a problem that when the slider 2 slides on the track rail 1, the under seal 30 may undergo deformations such as elongation due to temperature changes and swell caused by lubricating oil, resulting in buckling in the longitudinal direction and degradation in sealing performance.

In the conventional linear motion rolling guide unit, to accommodate a retainer plate for fixing the track rail to a bed or to prevent foreign matters such as dust or cutting chips from entering the raceway grooves from the under seal, a gap H1 must be provided between the lower end of the slider 2 and the lower end of the track rail, i.e. the upper surface of the bed 36, as shown in FIG. 9. However, because the lower ends of the end cap and of the casing are formed with the rolling element direction changing path and the rolling element circulation path, respectively, the lower ends of the end caps and casing could not be cut short.

Further, when the linear motion rolling guide unit has the structure shown in FIG. 9, in which the under seal 30 is fixed to the casing 3 by inserting screws 33 through through-holes in the under seal 30 and into threaded holes in the casing 3, the threaded holes must be formed in the casing 3, increasing the manufacturing cost. In the conventional linear motion rolling guide unit, the under seal is mounted to the undersides of the casing and of the end caps attached to the longitudinal ends of the casing, so that the under seal and the screws are located below the lower ends of the casing and the end caps, making it impossible to secure the large enough gap H1 between the lower end of the slider and the lower end of the track rail, i.e. the upper surface of the bed.

Japanese Utility Model Laid-Open No. 98321/1991 discloses a linear motion rolling guide unit, in which the axial end portions of the under seal are folded back inwardly to be formed into a U-shape; in which the folded surfaces are provided with inwardly projecting engagement portions; and in which the outer end of each end cap is formed with a recess that receives the engagement portion of the under seal. This construction has a drawback that the under seal, not made of a core bar lower surface member, may get deformed in the longitudinal direction.

Japanese Patent Laid-Open No. 164128/1993 discloses another linear motion rolling guide unit, in which the under seal consisting of a core bar lower surface member and an elastic member having a lip portion and secured to the core bar lower surface member is placed at the undersides of the casing and of the end caps attached to the longitudinal ends of the casing and is secured to the end seals placed in contact with the end caps. Although the under seal of this linear motion rolling guide unit uses a core bar lower surface member, there is a limit to the thickness of the under seal because it is attached to the underside of the casing, making it difficult to secure a large enough gap between the lower end of the slider and the lower end of the track rail.

In the linear motion rolling guide unit disclosed in Japanese Utility Model Application No. 91496/1992 previously filed by this inventor, the under seal—which has locking bands that extend externally widthwise at the longitudinal end portions of the core bar member fixedly attached with an elastic member, and locking claws that are formed by bending the free ends of the locking bands toward the end caps—is fitted in a recessed portion formed in the lower part of the end caps on the track rail side.

SUMMARY OF THE INVENTION

A primary object of this invention is to solve the above-mentioned problems and to provide a linear motion rolling guide unit, which utilizes whetstone accommodating spaces at the bottom of the casing—defined by inclined recessed surfaces of the casing on the track rail side and by the longitudinally extending side wall surfaces of the track rail and used to accommodate a whetstone to grind the raceway surfaces to be formed in the casing in mounting the under seals to the end caps, thereby securing a sufficiently large gap or height H1 between the slider's lower end and the track rail's lower end or bed surface, making the longitudinal bending of the under seals difficult to occur, and maintaining a good sealing performance at all times.

Another object of this invention is to provide a linear motion rolling guide unit, which comprises:

a track rail having first raceway surfaces formed on longitudinally extending side wall surfaces thereof;

a casing slidable relative to the track rail and having second raceway surfaces formed at positions facing the first raceway surfaces;

end caps mounted to longitudinal ends of the casing;

a number of rolling elements trapped and circulating through between the first raceway surfaces and the second raceway surfaces; and under seals mounted to the end caps to seal between the track rail, the casing and the end caps, the under seals being installed in whetstone accommodating spaces formed by inclined surfaces at the bottom of the casing on the track rail side, the under seals being mounted to the end caps by brackets extending upwardly from both ends of the under seals.

The under seal consists of a longitudinally extending core member and an elastic member having lip portions and secured to the core member. The brackets are integrally formed with, and extend upwardly from, the longitudinal ends of the core member. Formed at the free ends or the top of the brackets are locking claws that are bent inwardly toward the end cap side.

The elastic member of the under seal is formed with a lip portion on the track rail side that contacts the longitudinally extending side wall surface of the track rail. On the opposite side, the elastic member is formed with another lip portion having a contact surface that comes into contact with the inclined surface of the casing. At the longitudinal outer side of the recessed underside, the end cap is formed with an upwardly extending engagement groove for the bracket, at the upper end of which is formed an engagement hole that receives the locking claw. Thus, the mounting and dismounting of the under seals to and from the end caps can be done very easily and reliably by engaging or disengaging the locking claws of the brackets into or from the engagement holes of the engagement grooves.

In this linear motion rolling guide unit, the under seals can be mounted to the end caps by installing the under seals in the whetstone accommodating spaces in the casing, by engaging the brackets of the core member of the under seals in the engagement grooves in the end caps, and by fitting the locking claws of the brackets into the engagement holes formed at the upper end of the engagement grooves. The under seals therefore can easily be assembled to the underside of the slider made up of the casing and the end caps.

Further, for reinforcement of the under seal to prevent its bending, the core member of the under seal has rib portions protruding downwardly from the lateral ends or center of the underside of the core member so that it is U- or T-shaped in cross section. This structure makes it difficult for the under seal to undergo deformations such as bending and deflection, thus maintaining the sealing performance of the under seal. The under seal can also provide a large enough gap H1 between the slider's lower end and the track rail's lower end or bed surface, improving the sealing performance of the under seal.

Another feature of the linear motion rolling guide unit of this invention is that because the under seals are installed in the whetstone accommodating spaces at the bottom of the casing on the track rail side and are removably mounted to the end caps, there is no need to provide the slider with a specially formed space to mount the under seals, allowing a sufficiently large gap or height H1 to be formed between the underside of the slider and the underside of the track rail or the surface of the base. Further, it is possible to mount or remove only the under seals to or from the end caps, facilitating the replacement of the under seal. If necessary, the under seal can be easily assembled into the slider simply by forming the engagement grooves and engagement holes in the existing end caps.

Furthermore, in the linear motion rolling guide unit of this invention, the aforementioned construction of the under seals and of the means for mounting them to the end caps offers a further advantage. That is, even when the under seal swells from absorption of lubricant or elongates due to thermal expansion differences, the under seal can be prevented from being deformed as long as the brackets of the under seal are installed slightly expanded longitudinally from the normal state against their own spring force. This arrangement allows the elongation of the under seal to be absorbed within the range of the spring force of the brackets, preventing the under seal from undergoing deformations such as deflection. As a result, a good sealing condition is maintained at all times between the track rail and the slider.

DETAILED DESCRIPTION OF EMBODIMENTS

Figure 9:
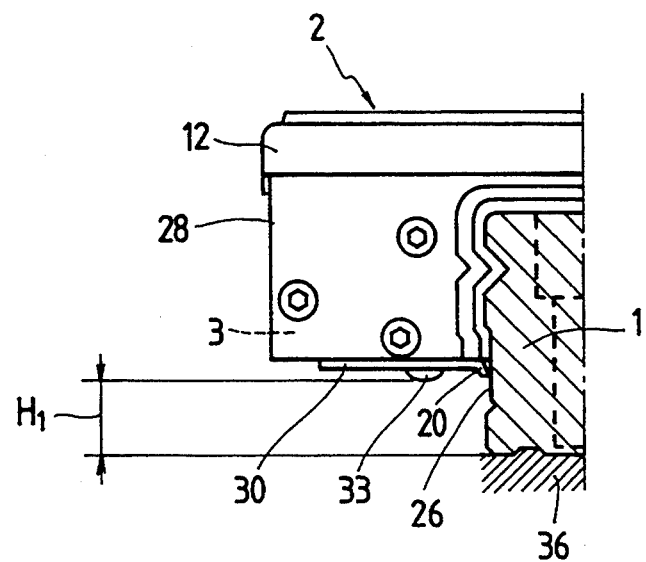
FIG. 9 is a fragmentary cross section showing one-half side of the center line of the conventional linear motion rolling guide unit.
Figure 10:
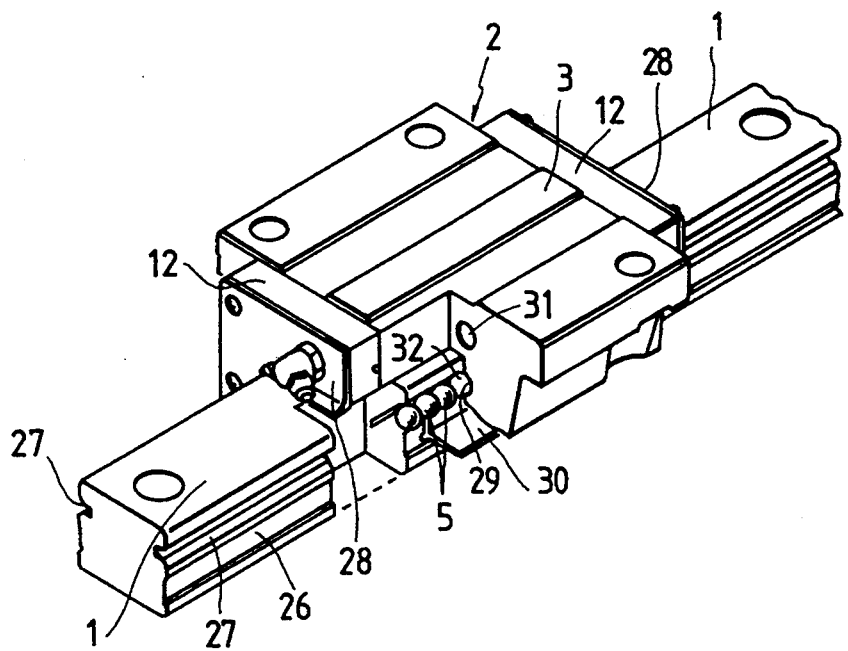
FIG. 10 is a partly cutaway perspective view of another example of the conventional linear motion rolling guide unit.

Now, by referring to the accompanying drawings, embodiments of the linear motion rolling guide unit according to this invention will be described. Components in FIG. 1 through 5 that are identical to the corresponding ones in FIG. 9 to 10 are given like reference numerals.

The linear motion rolling guide unit consists of: a track rail 1 having recessed portions 8 that are formed in longitudinally extending side wall surfaces 26 and defined by an upper raceway surface 6 and a lower raceway surface 7; and a slider 2 that is mounted astride and slidable relative to the track rail 1. The slider 2 is slidable relative to the track rail 1 and has a casing 3, which is formed with an upper raceway surface 9 and a lower raceway surface 10 at positions facing the upper raceway surface 6 and the lower raceway surface 7, respectively. The slider 2 also has end caps 12 attached to the longitudinal ends of the casing 3; retainers 11 secured between the raceway surfaces 9 and 10 of the casing 3 by a fixing bolt (not shown); and a large number of rolling elements 5 in the form of cylindrical rollers that are supported by the retainers 11 and roll running through a raceway 32 between the facing raceway surfaces 6 and 9 and between 7 and 10. The longitudinal outer end surfaces of the end caps are provided with end seals 28.

The casing 3 has the upper raceway surface 9 and the lower raceway surface 10 formed at positions facing the upper raceway 6 and the lower raceway surface 7, respectively, formed on the longitudinally extending side wall surfaces 26 of the track rail 1. To grind these raceway surfaces 9, 10 with a whetstone (not shown), a whetstone accommodating space 13 is formed at the lower part of the casing 3. The whetstone accommodating space 13 is provided by an inclined surface 35 cut into the underside of the casing 3 on the track rail side. As shown in FIG. 2(b), the inclined surface 35 formed on the casing 3 and the longitudinally extending side wall surfaces 26 of the track rail 1 together form the whetstone accommodating space 13. In this linear motion rolling guide unit, the under seal 4 that seals the raceway 32 for the rolling elements 5 and the sliding region of the slider 2 with respect to the track rail 1 is installed in the whetstone accommodating space 13.

Figure 1:
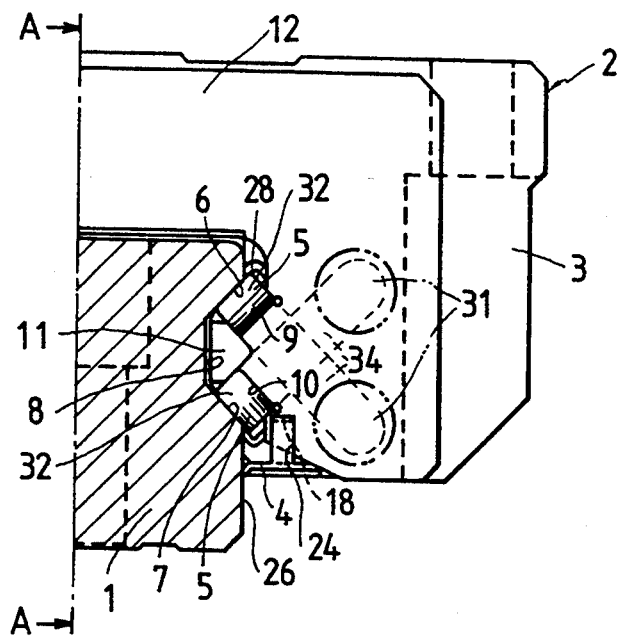
FIG. 1 is a fragmentary cross section showing one-half side of the center line of the linear motion rolling guide unit as one embodiment of this invention.
Figure 2:
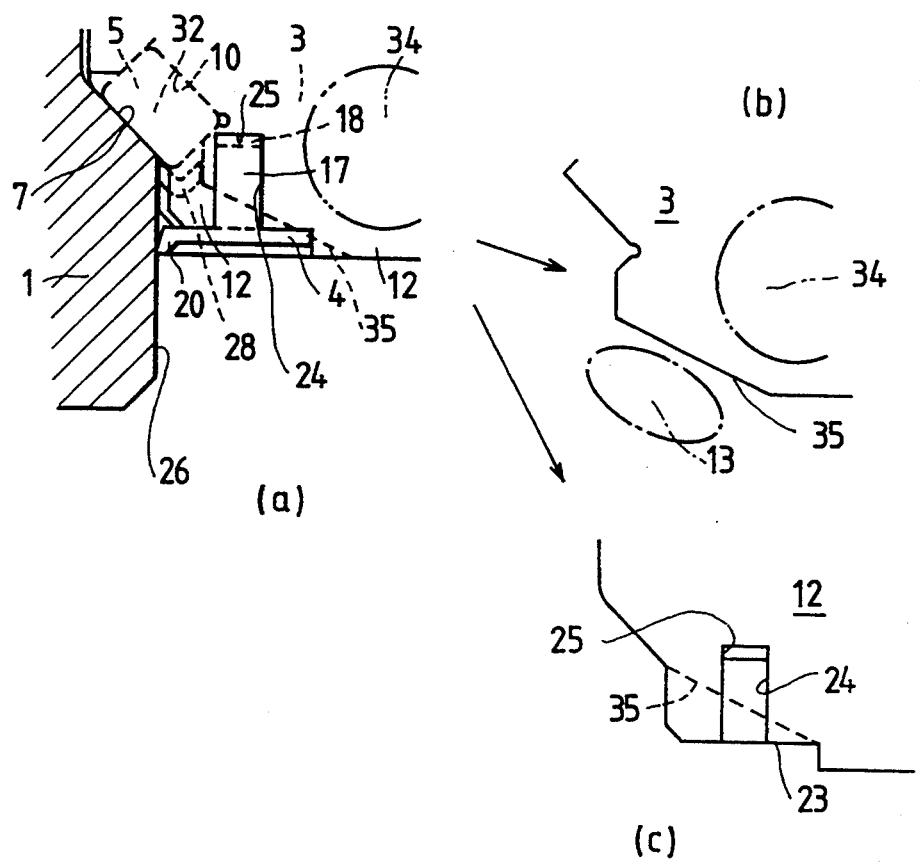
FIG. 2 is a fragmentary cross section showing an essential portion of the linear motion rolling guide unit of FIG. 1.
Figure 3:
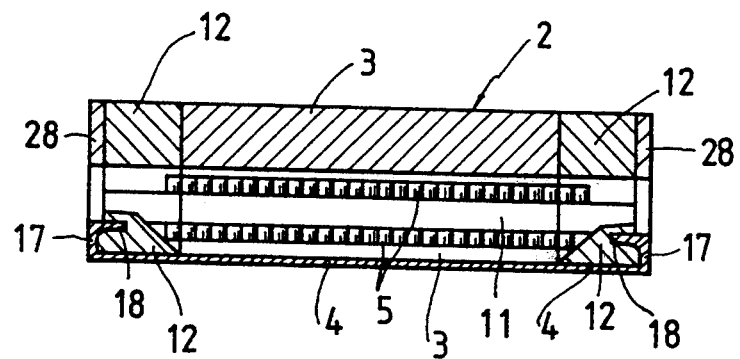
FIG. 3 is a cross section taken along the line A—A of FIG. 1.
Figure 4:
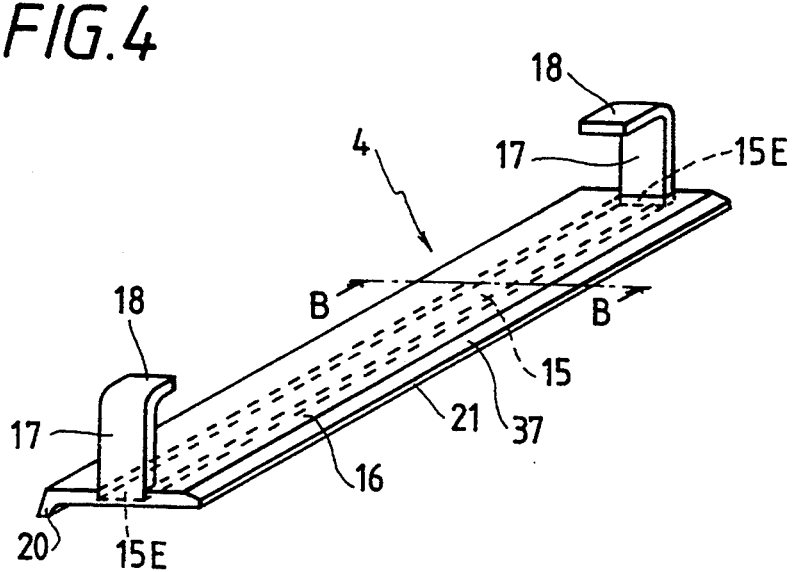
FIG. 4 is a perspective view of one embodiment of the under seal incorporated into the linear motion rolling guide unit of FIG. 1.
Figure 5:
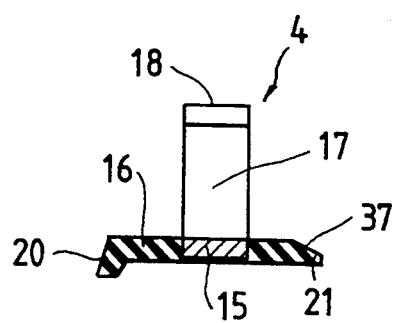
FIG. 5 is a cross section of the under seal taken along the line B—B of FIG. 4.

As shown in FIG. 4 and 5, the under seal 4 consists of a core member 15 made of such metals as steel and an elastic member 16 formed of such materials as rubber and plastic secured to the core member 15. At its longitudinal ends 15E the core member 15 is integrally formed with upwardly extending brackets 17. The upper end or free end of the bracket 17 is formed with a locking claw 18 that is bent inwardly toward the end cap 12. The elastic member 16 has on the track rail 1 side a lip portion 20 that is in contact with the longitudinally extending side wall surface 26 of the track rail 1 to provide sealing and, on the opposite side, a lip portion 21 that has a contact surface 37 engaging the inclined surface 35 of the casing 3. The contact surface 37 of the under seal 4 is preferably inclined more moderately than the inclined surface 35 of the casing 3 so that when the under seal 4 is mounted to the end caps 12 and the contact surface 37 of the under seal 4 placed in contact with the inclined surface 35 of the casing 3, the lip portion 21 of the contact surface 37 is elastically deformed and pressed against the inclined surface 35 of the casing 3, thus improving the sealing performance.

The end caps 12 attached to the longitudinal ends of the casing 3 has its bottom portion on the track rail 1 side formed with a recessed underside 23, as shown in FIG. 2(c), that corresponds to the shape of the under seal 4 so that the contact surface 37 of the under seal 4 located in the whetstone accommodating space 13 of the casing 3 will come into close contact with the inclined surface 35 of the casing 3 (see FIG. 2(b)). At the longitudinal outer side of the recessed underside 23, the end cap 12 is formed with an upwardly extending engagement groove 24, at the upper end of which is formed an engagement hole 25. That is, as shown in FIG. 2(a), the engagement groove 24 that extends upwardly along the longitudinal outer side of the recessed underside 23 of the end cap 12 accommodates the bracket 17 formed at the longitudinal ends of the under seal 4. The engagement hole 25 formed at the upper end of the engagement groove 24 receives the locking claw 18 at the free end of the bracket 17.

The under seal 4 is installed in the whetstone accommodating space 13 of the casing 3 from under the casing 3 and the end caps 12. Then, the brackets 17 of the under seal 4 are engaged in the engagement grooves 24 of the end caps 12, fitting the locking claws 18 of the brackets 17 into the engagement holes 25 of the end caps 12. In this way the under seal 4 is assembled into the slider 2. In this mounted state, the contact surface 37 of the under seal 4 comes into contact with the inclined surface 35 of the casing 3 to bring the lip portion 21 into close contact with the inclined surface 35 and at the same time the lip portion 20 contacts the longitudinally extending side wall surface 26 of the track rail 1, thus providing a seal. The retainer 11 for the cylindrical rolls is arranged between the upper raceway surface 9 and the lower raceway surface 10 formed on the casing 3.

The linear motion rolling guide unit with the above-mentioned construction offers the following features. Even when the under seal 4 swells from absorption of lubricant or elongates due to thermal expansion differences, the under seal 4 can be prevented from being deformed as long as the brackets 17 of the under seal 4 are installed slightly expanded longitudinally from the normal state against their own spring force. This arrangement allows the elongation of the under seal to be absorbed within the range of the spring force of the brackets 17, preventing the under seal from undergoing deformations such as deflection. As a result, a good sealing condition is maintained at all times between the track rail 1 and the slider 2.

Figure 6:
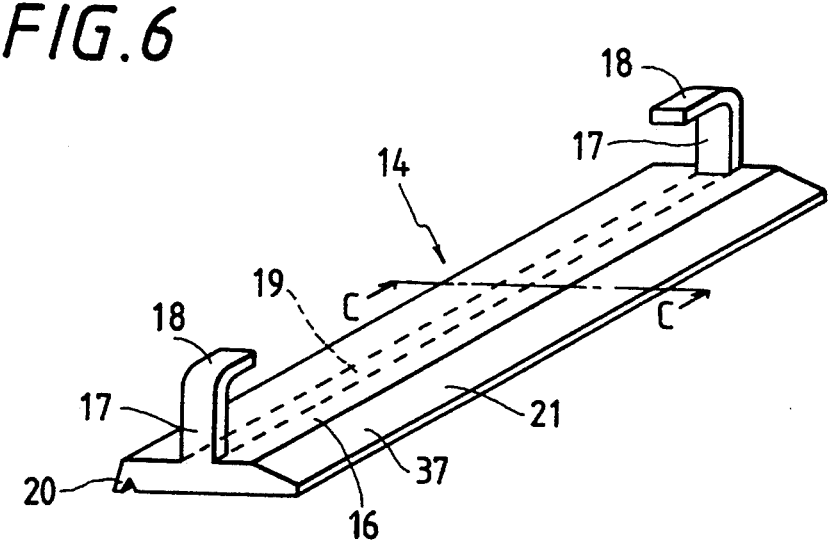
FIG. 6 is a perspective view of another embodiment of the under seal incorporated into the linear motion rolling guide unit of this invention.
Figure 7:
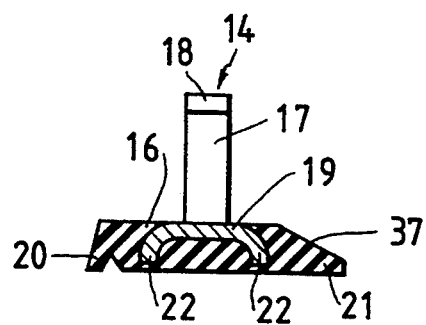
FIG. 7 is a cross section of the under seal taken along the line C—C of FIG. 6.

FIG. 6 and 7 show another embodiment of the under seal used in the linear motion rolling guide unit of this invention. In FIG. 6 and 7, components identical to those of FIG. 4 and 5 are given the same reference numerals.

The under seal 14 consists of a core member 19 made of such a metal material as steel and an elastic member 16 made of such an elastic material as rubber and plastic secured to the core member 19. The core member 19 of the under seal 14 has formed at the lateral ends thereof with reinforcement rib portions 22 that extend longitudinally downwardly. The core member 19 is therefore shaped like a letter U in cross section. The core member 19 has a virtually similar construction to that of the under seal 4 shown in FIG. 4 and 5 except that the cross section is U-shaped. The provision of the rib portions 22 in the core member 19 increases the rigidity and strength of the core member itself, making the deformation in the longitudinal direction difficult to occur.

The core member 19 is integrally formed with upwardly extending brackets 17 at the longitudinal ends of the core member 19. Each of the brackets 17 has a locking claw 18 at its upper end or free end which is inwardly bent toward the end cap side. The elastic member 16 is formed with a lip portion 20 on the track rail side that is in contact with the longitudinally extending side wall surface 26 of the track rail 1. On the opposite side, the elastic member is formed with a lip portion 21 which has a contact surface 37 adapted to engage with the recessed underside or inclined surface 35 of the casing 3.

In this embodiment, because the core member 19 of the under seal 14 has the rib portions 22, the longitudinal deformations, such as bending, of the under seal 14 is made difficult to occur. As a result, a good sealing for the casing 3 and the track rail 1 can be maintained at all times.

Figure 8:
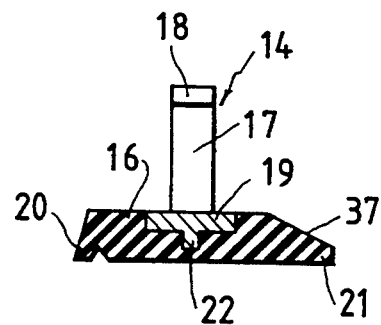
FIG. 8 is a cross section of another embodiment of the under seal taken along the line C—C of FIG. 6.

Still another embodiment of the under seal used in the linear motion rolling guide unit of this invention is shown in FIG. 8. Components in FIG. 8 that are identical with those of FIG. 7 are given like reference numbers. This embodiment has the same construction and working as those of the preceding embodiment except that a longitudinally extending projection 22 is formed at the center of the underside of the core member 19. The under seal 14 of this embodiment has the similar function to that of the under seal 14 shown in FIG. 7.

I claim:

1. A linear motion rolling guide unit comprising:
    a track rail having first raceway surfaces formed on longitudinally extending side wall surfaces thereof;
    a casing slidable relative to the track rail and having second raceway surfaces formed at positions facing the first raceway surfaces;
    end caps mounted to longitudinal ends of the casing;
    rolling elements rolling and circulating through between the first raceway surfaces and the second raceway surfaces; and
    under seals mounted to the end caps to seal between the track rail, the casing and the end caps, each of the under seals having a longitudinally extending core member, an elastic member having lip portions and secured to the core member, and brackets extending upwardly from the ends of the core member;
    wherein the core members and the elastic members are positioned in whetstone accommodating spaces defined by inclined surfaces formed at the underside of the casing on the track rail side;
    wherein the brackets of the under seals are attached to the end caps.

2. A linear motion rolling guide unit according to claim 1, wherein the core members and elastic members of the under seals are accommodated in the whetstone accommodating spaces, and the lower end of the under seals does not protrude downwardly from the lower end of the end caps and the casing.

3. A linear motion rolling guide unit according to claim 1, wherein the brackets are formed at their upper end with locking claws bent toward the end cap side, and the end caps are formed with engagement holes that receive the locking claws.

4. A linear motion rolling guide unit according to claim 3, wherein the brackets are formed of an elastic member and the locking claws are urged by a spring force to engage in the engagement holes of the end caps.

5. A linear motion rolling guide unit according to claim 1, wherein the end caps are formed with engagement grooves at portions facing the upwardly extending portions of the brackets, and the brackets are fitted in the engagement grooves.

6. A linear motion rolling guide unit according to claim 5, wherein the engagement holes are formed at the upper end of the engagement grooves that are formed in the end caps.

7. A linear motion rolling guide unit according to claim 1, wherein the core member of the under seals has downwardly extending, longitudinal rib portions that reinforce the under seals for prevention of bending.

8. A linear motion rolling guide unit according to claim 7, wherein the rib portions in the core member are each formed of a projection protruding downwardly from, and extending longitudinally along, the center of the underside of the core member.

9. A linear motion rolling guide unit according to claim 7, wherein the rib portions in the core member are each formed of projections protruding downwardly from, and extending longitudinally along, edges of the core member.

* * * * *